United States Patent
Wagner et al.

(10) Patent No.: US 9,248,532 B2
(45) Date of Patent: Feb. 2, 2016

(54) SCREW TENSIONING DEVICE

(71) Applicant: WAGNER VERMÖGENSVERWALTUNGS-GMBH & CO. KG, Much (DE)

(72) Inventors: P. H. Wagner, Much-Birrenbachshoehe (DE); Bernd Thelen, Much (DE)

(73) Assignee: Wagner Vermoegensverwaltungs-GMBH & Co. KG, Much (DE)

( * ) Notice: Subject to any disclaimer, the term of this patent is extended or adjusted under 35 U.S.C. 154(b) by 0 days.

(21) Appl. No.: 14/086,257

(22) Filed: Nov. 21, 2013

(65) Prior Publication Data

US 2014/0245868 A1    Sep. 4, 2014

Related U.S. Application Data

(63) Continuation of application No. 13/129,207, filed as application No. PCT/EP2009/064545 on Nov. 3, 2009, now abandoned.

(30) Foreign Application Priority Data

Nov. 14, 2008 (DE) ...................... 20 2008 015 148 U

(51) Int. Cl.
*B25B 17/00* (2006.01)
*B23P 19/06* (2006.01)
*B25B 29/02* (2006.01)

(52) U.S. Cl.
CPC ............... *B23P 19/067* (2013.01); *B25B 29/02* (2013.01)

(58) Field of Classification Search
CPC ........ B25B 29/02; B23P 19/067; Y02E 30/40

USPC ........................................... 81/54, 429, 57.38
See application file for complete search history.

(56) References Cited

U.S. PATENT DOCUMENTS 3,722,332 A * 3/1973 Jones ...................... B25B 29/02
                                                                  254/29 A
3,837,694 A * 9/1974 Frisch et al. ............. 292/256.75
(Continued)

FOREIGN PATENT DOCUMENTS

DE        30 47 674            7/1982
DE        93 16 464 U1        1/1994
(Continued)

OTHER PUBLICATIONS

International Search Report for corresponding application No. PCT/EP2009/064545 dated Feb. 17, 2010.
(Continued)

*Primary Examiner* — Hadi Shakeri
*Assistant Examiner* — Danny Hong
(74) *Attorney, Agent, or Firm* — Renner, Otto, Boisselle & Sklar, LLP

(57) ABSTRACT

The screw tensioning device comprises a support tube (12), a cylinder member (15) and a piston section (17). The piston section serves for moving a tensioning bolt (20) screwed onto the thread of a threaded bolt (31). Provided according to the invention is a depth measuring device (35), which presents an externally visible indication of the screw-in depth (ET) of the threaded bolt (31). This ensures that, when the threaded bolt (31) undergoes extension under strain, there is a threaded engagement with the tensioning bolt (20) along a sufficiently long distance. This avoids the hazard that the screw tensioning device might break off from the threaded bolt.

8 Claims, 2 Drawing Sheets

(56) References Cited

U.S. PATENT DOCUMENTS

| | | | |
|---|---|---|---|
| 3,877,326 A * | 4/1975 | Kock et al. | 81/57.38 |
| 4,047,456 A * | 9/1977 | Scholz | 81/57.38 |
| 4,185,504 A * | 1/1980 | Exner et al. | 73/761 |
| 4,185,505 A * | 1/1980 | Exner | G01L 5/24 |
| | | | 73/761 |
| 4,280,380 A * | 7/1981 | Eshghy | B23P 19/066 |
| | | | 173/183 |
| 5,803,436 A * | 9/1998 | Hohmann et al. | 254/29 A |
| 7,062,998 B2 * | 6/2006 | Hohmann et al. | 81/429 |
| 7,275,462 B2 * | 10/2007 | Faus et al. | 81/57.38 |
| 7,469,592 B2 * | 12/2008 | Hohmann et al. | 73/761 |
| 7,513,178 B2 * | 4/2009 | Hohmann et al. | 81/57.38 |
| 7,661,336 B2 * | 2/2010 | Hohmann et al. | 81/57.38 |
| 8,305,209 B2 * | 11/2012 | Morita et al. | 340/539.22 |
| 8,480,340 B2 * | 7/2013 | Riestra | 411/14.5 |
| 2008/0034925 A1 | 2/2008 | Hohmann et al. | |
| 2011/0188960 A1 * | 8/2011 | Hohmann et al. | 411/14.5 |

FOREIGN PATENT DOCUMENTS

| | | |
|---|---|---|
| DE | 10 2005 015922 | 10/2006 |
| GB | 2 272 741 | 5/1994 |
| WO | 2006/027060 | 3/2006 |

OTHER PUBLICATIONS

European Examination Report for corresponding application No. 09 751 879.9 dated Oct. 9, 2013.

* cited by examiner

SCREW TENSIONING DEVICE

This application is continuation of U.S. application Ser. No. 13/129,207 filed on May 13, 2011 which is a U.S. National Phase Application of PCT/EP2009/064545 filed on Nov. 3, 2009 which claims priority of German Application No. 20 2008 015 148.1 filed Nov. 14, 2008, these applications being fully incorporated herewith by reference.

The invention relates to a screw tensioning device for stretching a threaded bolt carrying a nut, said screw tensioning device comprising a support tube and a cylinder member provided in the axial extension of the support tube, said cylinder member including an axially moveable piston section, and comprising a tensioning bolt extending through the piston section and arranged in engagement with the piston so as to be axially entrained thereby.

Screw tensioning devices are known for the purpose of tightening and releasing highly stressed screw connections. A screw tensioning device has the function of exerting a precisely predetermined biasing force onto the screw connection in order to allow for the tightening or releasing of the nut of the screw connection that had been threaded onto a threaded bolt. For tightening or releasing the nut, the screw tensioning device will be screwed onto the thread—projecting beyond the nut—of the threaded bolt and then be subjected to hydraulic pressure. The screw-in depth of the threaded bolt into the tensioning bolt must have a length of at least 1×D, with D being the diameter of the threaded bolt, for ensuring that the threaded bolt will not be damaged by the tensioning process. Failure to maintain a projecting length of 1×D of the bolt will entail the danger that the screw tensioning device tears off, resulting in hazard to persons and objects.

In DE 10 2005 015 922 B4, a screw tensioning device is described which is provided with a measurement rod for measuring the relative displacement of the thread end of the threaded bolt relative to the hydraulic cylinder and casing, respectively, of the screw tensioning device. Thereby, however, one will merely obtain a measure of the respective stretch of the threaded bolt but no information yet on whether the tensioning bolt has been screwed onto the threaded bolt to a sufficient extent.

It is an object of the invention to provide a screw tensioning device wherein the screw-in depth is visualized in a simple manner so that the checking of the minimum projecting length of the bolt will not require additional tools or working steps.

The screw tensioning device of the invention is defined by claim 1. It is characterized in that the tensioning bolt is formed with an axial bore comprising a depth measuring device for indication of the axial position of the end of the threaded bolt relative to the tensioning bolt. Thus, the screw tensioning device is provided with an integrated depth measuring device which comprises an externally visible gauge indicating the measure of the projecting length of the bolt.

The invention makes it possible, without additional provisions on the screw tensioning device, to detect whether the required projecting length of the bolt is maintained. Thereby, handling the screw tensioning device is facilitated and the time required for correctly tightening or releasing the screw connection is reduced. The interior depth measuring device is encapsulated in a manner keeping it free from external influences which might cause damage or might impair the functioning of the device. In the process of screw-mounting the hydraulic tensioning device, the projecting length of the thread will be automatically measured and respectively checked and will be visually indicated.

According to a preferred embodiment of the invention, it is provided that the tensioning bolt comprises an axial threaded bore for screwing the threaded bolt thereinto, and that the threaded bore terminates at and end-side edge of the tensioning bolt. The lower end of the threaded bore has the function of a reference position forming the basis from where the screw-in depth of the threaded bolt will be measured.

Said depth measuring device preferably comprises a measurement rod, arranged to be axially movable in a channel of the tensioning bolt, which on one end is provided with an abutment portion and on the other end is provided with a marking adapted to project from a casing of the screw tensioning device. Said measurement rod can project from the casing of the screw tensioning device. On this end of the measurement rod, said marking is arranged, e.g. in the form of a green area. If the marking is visible from the outside, this will indicate a correct projecting length of the bolt. If, however, the acceptance marking is not visible, the projecting length is too short. The measurement rod can also be provided with a marking indicating an incorrect state, e.g. in red color, which, if visible, will signal an insufficient projecting length.

According to a preferred embodiment of the invention, the tensioning bolt is provided with a spring biasing the measurement rod toward said second end. Under the effect of the spring, the measurement rod is forced in the direction toward the threaded bolt and into tight abutment on the end face of the threaded bolt.

An exemplary embodiment of the invention will be explained in greater detail hereunder with reference to the drawings.

In the drawings, the following is shown:

Figure 1:
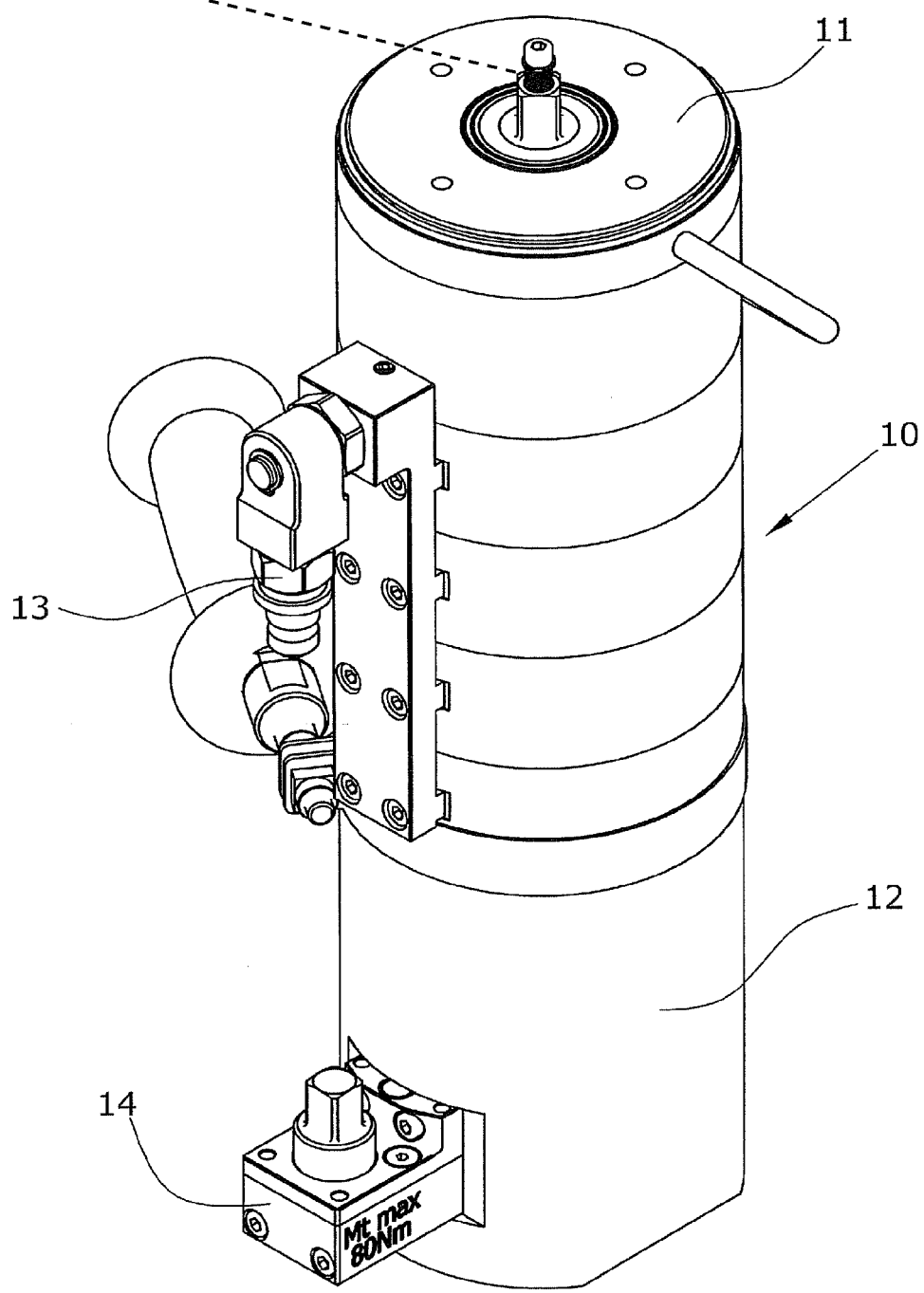
FIG. 1 is a view of the screw tensioning device.

The hydraulic screw tensioning device illustrated herein comprises a casing 10 which is substantially cylindrical and has an upper end wall 11, while the lower end is formed by a support tube 12 with an open bottom. A hydraulic connector 13 is arranged laterally on casing 10. Further provided is a gear transmission 14 which can be rotated by use of a tool for thus rotating the nut seated on the threaded bolt.

Above said support tube 12, casing 10 comprises a cylinder member 15 with a plurality of hydraulic cylinders 16, all of them being arranged hydraulically parallel and connected to said hydraulic connector 13. An axially moveable piston section 17 includes the pistons 18 which can be moved within the cylinders 16. Piston section 17 is supported against said upper end wall 11 by means of a spring device 19. The spring device 19 urges the pistons 18 into the lower end position. By hydraulic pressure within the cylinders 16, the pistons 18 will be pushed upward against the effect of spring 19.

Piston section 17 has an annular shape. A tensioning bolt 20, comprising a shaft portion 21 and a coupling portion 22, is arranged to extend coaxially through the piston section. Said coupling portion 22 is arranged internally of support tube 12 and includes an axial threaded bore 23 terminating at an end face 24.

Figure 2:
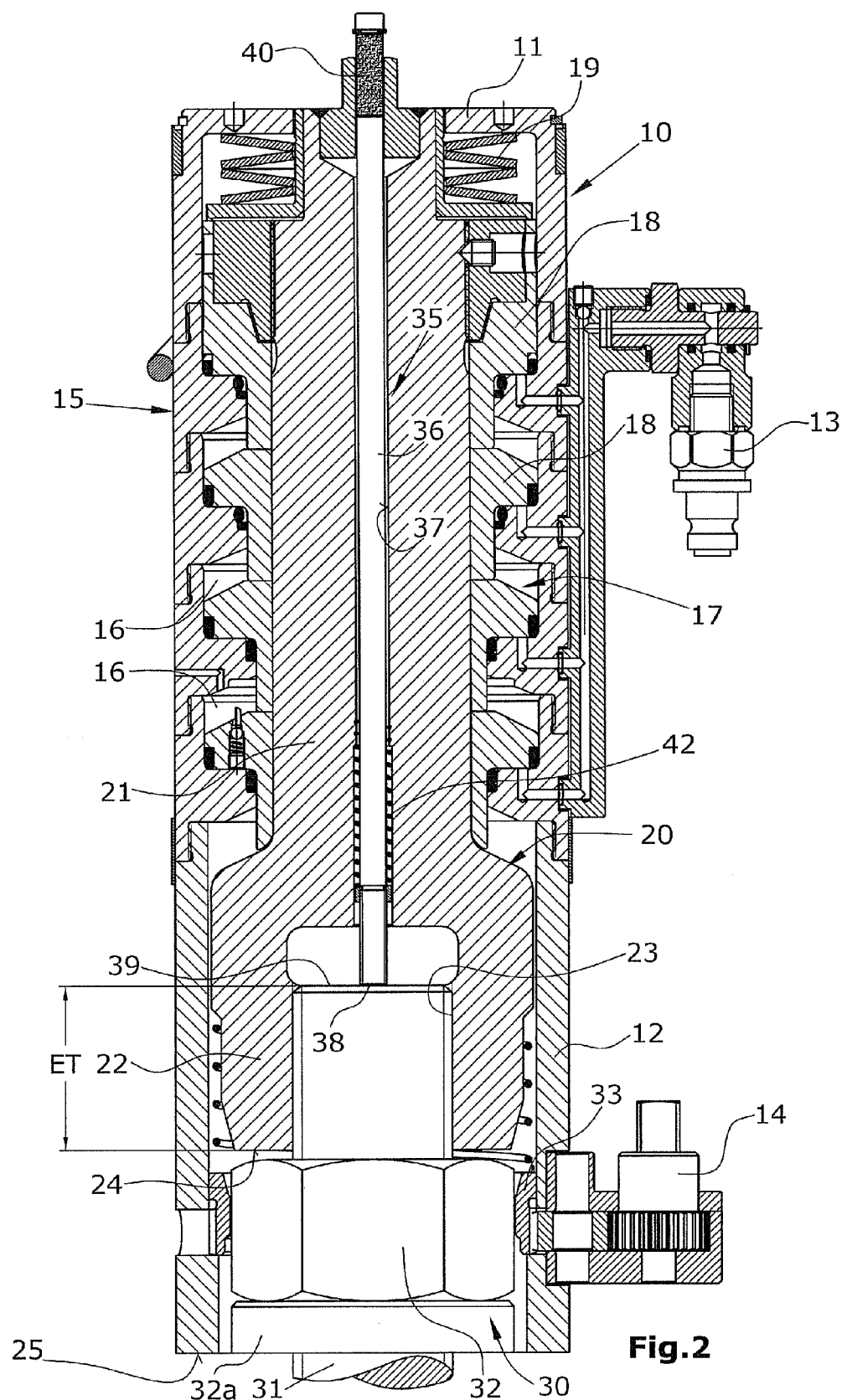
FIG. 2 is a longitudinal sectional view of the screw tensioning device.

Further illustrated in FIG. 2 is the screw connection 30. The screw connection comprises a threaded bolt 31 with an outer thread, and a nut 32 screwed onto said outer thread and provided with an underlying washer 32*a*. Said threaded bolt 31 is a component part of the workpiece on which the support tube 12 is supported by its end face 25. The hydraulic tensioning device serves for axially stretching the threaded bolt 31 in order to allow the nut 32 to be rotated without larger resistance. This rotating movement can be performed via the gear transmission 14 or by manual engagement of the nut via slits in support tube 12. The support tube is provided with a wrench ring 33 whose inner contour is adapted to the hexagonal contour of nut 32 and which can be rotated by transmission gear 14. Said wrench ring 33 is rotatable relative to support tube 12. In this manner, nut 32 can be rotated while the threaded bolt 31 remains fixed.

For the tensioning process, it is important that a specific minimum screw-in depth of threaded bolt 31 into said threaded bore 23 is maintained. This screw-in depth ET normally has to be at least equal to D, with D being the thread diameter of the threaded bolt. For measurement of the screw-in depth ET, a depth measurement device 35 is provided. The latter comprises a measurement rod 36 extending through an axial channel 37 of shaft portion 21. Said measurement rod 36 extends into threaded bore 23. Its end forms an abutment portion 38 for abutment against the end 39 of threaded bolt 31. The opposite end is provided with a marking 40, e.g. a color marking, which can be moved out of the end wall 11 of the casing and will then be visible from outside.

Arranged internally of tensioning bolt 20 is a spring 42 which by one of its ends is supported on the tensioning bolt and by its other end engages the measurement rod 36 and presses the same toward the threaded bolt 31.

When using the screw tensioning device, one will first screw the nut 32 loosely onto the threaded bolt 31. Then, the screw tensioning device will be placed onto the screw connection 30 and be rotated about its axis, thus screwing the tensioning bolt 20 onto the threaded portion of threaded bolt 31. With the aid of the depth measurement device 35, it will be detected whether the projecting length U of the threaded bolt beyond the nut 32 is sufficiently large for pressing the marking 40 out from the casing. The depth measurement device 35 is encapsulated within the screw tensioning device and thus accommodated in a well-protected manner, preventing it from exposure to external influences. In the process of screwing the screw tensioning device onto the threaded bolt 31, the measurement rod 36 is pressed upward against the pressure of spring 42 so that the marking 40, which in the unused state is sunk within the casing, will be moved outward and thus become visible. Thereby, the user is informed that the projecting length of the threaded bolt 31 beyond nut 32 is sufficient to allow for the pressurization of cylinder member 15.

In the present embodiment, the marking 40 will give an optical signal. Alternatively or additionally, it can be provided, according to a preferred embodiment of the invention, that an acoustic acceptance signal is generated when the measurement rod 36 is in the acceptable range. The user will then not need to focus his/her gaze to the tensioning device.

The invention claimed is:

1. A screw tensioning device for stretching a threaded bolt carrying a nut, said screw tensioning device comprising:
   a support tube and a cylinder member provided in an axial extension of the support tube, said cylinder member surrounding an axially moveable piston section, and
   a tensioning bolt extending through the piston section and arranged in engagement with the piston section so as to be axially entrained, the tensioning bolt having an axial threaded bore for screwing the tensioning bolt onto the threaded bolt,
   wherein the tensioning bolt comprises an axial channel provided with a depth measurement device that has an indicator that provides at least one of a visual or audible indication that the tensioning bolt has been threaded a prescribed amount onto the threaded bolt, and
   wherein the depth measurement device comprises a measurement rod arranged to be axially movable in said channel of the tensioning bolt, said measurement road at one end thereof being provided with an abutment portion for engaging an end of the threaded bolt and at an opposite end being provided with the indicator in the form of a marking movable from a first position indicating that the tensioning bolt has not been threaded by the prescribed amount onto the threaded bolt to a second position indicating that the tensioning bolt has been threaded by the prescribed amount onto the threaded bolt, and a spring interposed between the tensioning bolt and the measurement rod for applying a biasing force to the measurement rod toward the first position and away from the second position, such that upon threading of the tensioning bolt onto the threaded bolt, the measurement rod will move against the biasing force toward the second position.

2. The screw tensioning device of claim 1, wherein the prescribed amount corresponds to when the tensioning bolt has been threaded onto the threaded bolt a distance at least equal the thread diameter of the threaded bolt.

3. The screw tensioning device of claim 1, wherein the depth measurement device emits an optical and/or acoustic signal when the screw-in depth of the threaded bolt is in a predetermined range.

4. A method for stretching a threaded bolt using a screw tensioning device that includes a support tube and a cylinder member provided in an axial extension of the support tube, the cylinder member surrounding an axially moveable piston section, and the screw tensioning device further including a tensioning bolt extending through the piston section and arranged in engagement with the piston section so as to be axially entrained, wherein the tensioning bolt has an axial channel provided with a depth measurement device for indicating the axial position of the end of the threaded bolt relative to the tensioning bolt, the method comprising the steps of:
   positioning the screw tensioning device over a protruding portion of a threaded bolt that protrudes beyond a nut threaded onto the threaded bolt, threading the tensioning bolt of the screw tensioning device onto the protruding portion of the threaded bolt,
   using the depth measurement device to provide at least one of a visual or audible indication of when the tensioning bolt has been threaded onto the protruding portion by a prescribed amount, and then pressurizing the cylinder member to cause the piston section to forceably move the tensioning bolt and thereby stretch the threaded bolt whereafter the nut can be tightened or loosened on the threaded bolt,
   wherein the using step includes biasing an end of the measurement rod against an end of the threaded rod, with the measurement rod being caused to move axially within the tensioning bolt against the biasing force as the tensioning bolt is threaded onto the treaded bolt, and using a marking on the other end of the threaded rod to indicate that the tensioning bolt has been threaded by the prescribed amount onto the threaded bolt, and
   wherein the using step includes obscuring the marking from view until the tensioning bolt has been threaded onto the threaded bolt by the prescribed amount.

5. The screw tensioning device of claim 1, wherein the marking is hidden from view until the marking reaches the second position at which it becomes visible to indicate that the tensioning bolt has been threaded onto the threaded rod by the prescribed amount.

6. The screw tensioning device of claim 1, wherein the marking is a color marking.

7. The method of claim 4, wherein the using step includes emitting at least one of an optical and acoustic signal when the tensioning bolt has been threaded onto the threaded bolt by the prescribed amount.

8. A method for stretching a threaded bolt using a screw tensioning device that includes a support tube and a cylinder member provided in an axial extension of the support tube, the cylinder member surrounding an axially moveable piston section, and the screw tensioning device further including a tensioning bolt extending through the piston section and arranged in engagement with the piston section so as to be axially entrained, wherein the tensioning bolt has an axial channel provided with a depth measurement device for indicating the axial position of the end of the threaded bolt relative to the tensioning bolt, the method comprising the steps of:

positioning the screw tensioning device over a protruding portion of a threaded bolt that protrudes beyond a nut threaded onto the threaded bolt, threading the tensioning bolt of the screw tensioning device onto the protruding portion of the threaded bolt, using the depth measurement device to provide at least one of a visual or audible indication of when the tensioning bolt has been threaded onto the protruding portion by a prescribed amount, and then pressurizing the cylinder member to cause the piston section to forceably move the tensioning bolt and thereby stretch the threaded bolt whereafter the nut can be tightened or loosened on the threaded bolt, wherein the using step includes obscuring a marking from view until the tensioning bolt has been threaded onto the threaded bolt by the prescribed amount, and moving the marking into view when the tensioning bolt has been threaded onto the threaded bolt by the prescribed amount.

* * * * *